(12) United States Patent
Aksyutina et al.

(10) Patent No.: US 10,336,320 B2
(45) Date of Patent: Jul. 2, 2019

(54) MONITORING OF COMMUNICATION FOR VEHICLE REMOTE PARK-ASSIST

(71) Applicant: Ford Global Technologies, LLC, Dearborn, MI (US)

(72) Inventors: Yuliya Aksyutina, Nordrhein-Westfalen (DE); Armin Mueller-Lerwe, Kerpen-Bergerhausen (DE); Erick Michael Lavoie, Dearborn, MI (US); John Robert Van Wiemeersch, Novi, MI (US); Ahmed Benmimoun, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/821,350

(22) Filed: Nov. 22, 2017

(65) Prior Publication Data
US 2019/0152472 A1  May 23, 2019

(51) Int. Cl.
| *B60W 30/06* | (2006.01) |
| *G05D 1/00* | (2006.01) |
| *H04W 4/80* | (2018.01) |
| *H04W 84/12* | (2009.01) |

(52) U.S. Cl.
CPC .......... *B60W 30/06* (2013.01); *G05D 1/0022* (2013.01); *B60W 2510/06* (2013.01); *B60W 2510/10* (2013.01); *B60W 2550/40* (2013.01); *H04W 4/80* (2018.02); *H04W 84/12* (2013.01)

(58) Field of Classification Search
USPC .......................................................... 701/2
See application file for complete search history.

(56) References Cited

U.S. PATENT DOCUMENTS

| 6,356,828 | B1 | 3/2002 | Shimizu |
| 6,476,730 | B2 | 11/2002 | Kakinami |
| 6,657,555 | B2 | 12/2003 | Shimizu |
| 6,683,539 | B2 | 1/2004 | Trajkovic |
| 6,724,322 | B2 | 4/2004 | Tang |
| 6,744,364 | B2 | 6/2004 | Wathen |
| 6,768,420 | B2 | 7/2004 | McCarthy |

(Continued)

FOREIGN PATENT DOCUMENTS

| CN | 101929921 A | 12/2010 |
| CN | 103818204 A | 5/2014 |

(Continued)

OTHER PUBLICATIONS

US 9,772,406 B2, 09/2017, Liu (withdrawn)

(Continued)

*Primary Examiner* — Tyler D Paige
(74) *Attorney, Agent, or Firm* — Frank Lollo; Neal, Gerber & Eisenberg LLP; James P. Muraff

(57) ABSTRACT

Method and apparatus are disclosed for monitoring of communication for vehicle remote park-assist. An example vehicle includes an autonomy unit for remote parking, a communication module, and a controller. The controller is to send a counter signal to and receive a return signal from a mobile device via the communication module, determine a time period between sending of the counter signal and receipt of the return signal, and prevent the autonomy unit from causing vehicle movement responsive to determining the time period is less than a threshold.

20 Claims, 5 Drawing Sheets

(56) References Cited

U.S. PATENT DOCUMENTS

| | | |
|---|---|---|
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 7,042,332 B2 | 5/2006 | Takamura |
| 7,123,167 B2 | 10/2006 | Staniszewski |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 8,035,503 B2 | 10/2011 | Partin |
| 8,054,169 B2 | 11/2011 | Bettecken |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,587,681 B2 | 11/2013 | Guidash |
| 8,594,616 B2 | 11/2013 | Gusikhin |
| 8,599,043 B2 | 12/2013 | Kadowaki |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,225,531 B2 | 12/2015 | Hachey |
| 9,233,710 B2 | 1/2016 | Lavoie |
| 9,273,966 B2 | 3/2016 | Bartels |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,469,247 B2 | 10/2016 | Juneja |
| 9,493,187 B2 | 11/2016 | Pilutti |
| 9,506,774 B2 | 11/2016 | Shutko |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,754,173 B2 | 9/2017 | Kim |
| 9,809,218 B2 | 11/2017 | Elie |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,975,504 B2 | 5/2018 | Dalke |
| 10,131,347 B2 | 11/2018 | Kim |
| 2003/0060972 A1 | 3/2003 | Kakinami |
| 2003/0098792 A1 | 5/2003 | Edwards |
| 2005/0030156 A1* | 2/2005 | Alfonso .................. B60R 25/04 340/5.61 |
| 2005/0099275 A1 | 5/2005 | Kamdar |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0289813 A1 | 11/2009 | Kwiecinski |
| 2009/0313095 A1 | 12/2009 | Hurpin |
| 2010/0025942 A1 | 2/2010 | Von Rehyer |
| 2010/0114471 A1 | 5/2010 | Sugiyama |
| 2010/0114488 A1 | 5/2010 | Khamharn |
| 2010/0152972 A1 | 6/2010 | Attard |
| 2010/0156672 A1 | 6/2010 | Yoo |
| 2010/0259420 A1 | 10/2010 | Von Reyher |
| 2011/0071725 A1 | 3/2011 | Kleve |
| 2011/0082613 A1 | 4/2011 | Oetiker |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0073119 A1 | 3/2013 | Huger |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0096051 A1 | 4/2014 | Boblett |
| 2014/0121930 A1 | 5/2014 | Allexi |
| 2014/0147032 A1 | 5/2014 | Yous |
| 2014/0188339 A1 | 7/2014 | Moon |
| 2014/0222252 A1 | 8/2014 | Matters |
| 2014/0240502 A1 | 8/2014 | Strauss |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1* | 11/2014 | Park .................. B62D 15/0285 701/51 |
| 2014/0350855 A1 | 11/2014 | Vishnuvajhala |
| 2014/0365126 A1 | 12/2014 | Vulcano |

(56) References Cited

U.S. PATENT DOCUMENTS

| | | |
|---|---|---|
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0153178 A1 | 6/2015 | Koo |
| 2015/0161890 A1 | 6/2015 | Huntzicker |
| 2015/0163649 A1 | 6/2015 | Chen |
| 2015/0203111 A1 | 7/2015 | Bonnet |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0371541 A1 | 12/2015 | Korman |
| 2015/0375741 A1 | 12/2015 | Kiriya |
| 2016/0012726 A1 | 1/2016 | Wang |
| 2016/0055749 A1 | 2/2016 | Nicoll |
| 2016/0153778 A1 | 2/2016 | Singh |
| 2016/0062354 A1 | 3/2016 | Li |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1* | 5/2016 | Ohshima ............. G05D 1/0061 701/23 |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0236680 A1 | 8/2016 | Lavoie |
| 2016/0257304 A1 | 9/2016 | Lavoie |
| 2016/0272244 A1* | 9/2016 | Imai ...................... G08G 1/166 |
| 2016/0282442 A1 | 9/2016 | O'Mahony |
| 2016/0284217 A1 | 9/2016 | Lee |
| 2016/0288657 A1 | 10/2016 | Tokura |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0355125 A1 | 12/2016 | Herbert |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0208438 A1 | 7/2017 | Dickow |
| 2017/0297385 A1 | 10/2017 | Kim |
| 2017/0301241 A1 | 10/2017 | Urhahne |
| 2017/0308075 A1 | 10/2017 | Whitaker |
| 2018/0024559 A1 | 1/2018 | Seo |
| 2018/0029591 A1 | 2/2018 | Lavoie |
| 2018/0039264 A1 | 2/2018 | Messner |
| 2018/0043884 A1 | 2/2018 | Johnson |
| 2018/0056939 A1 | 3/2018 | van Roermund |
| 2018/0194344 A1 | 7/2018 | Wang |
| 2018/0236957 A1 | 8/2018 | Min |

FOREIGN PATENT DOCUMENTS

| | | |
|---|---|---|
| CN | 104485013 A | 4/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 104290751 B | 1/2018 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009051055 A1 | 7/2010 |
| DE | 102012008858 A1 | 11/2012 |
| DE | 102012200725 A1 | 7/2013 |
| DE | 102013004214 A1 | 9/2013 |
| DE | 102010034129 B2 | 10/2013 |
| DE | 102010034129 B4 | 10/2013 |
| DE | 102012215218 A1 | 6/2014 |
| DE | 102012222972 A1 | 6/2014 |
| DE | 102013213064 A1 | 1/2015 |
| DE | 102014009077 A1 | 2/2015 |
| DE | 102013016342 A1 | 4/2015 |
| DE | 102013019771 A1 | 5/2015 |
| DE | 102013019904 A1 | 5/2015 |
| DE | 102014007915 A1 | 12/2015 |
| DE | 102014011802 A1 | 2/2016 |
| DE | 102014111570 A1 | 2/2016 |
| DE | 102014015655 A1 | 4/2016 |
| DE | 102015209976 A1 | 12/2016 |
| DE | 102015221224 A1 | 5/2017 |
| DE | 102016011916 A1 | 6/2017 |
| DE | 102016125282 A1 | 7/2017 |
| DE | 102016211021 A1 | 12/2017 |
| EP | 2295281 A1 | 3/2011 |
| EP | 2653367 A1 | 10/2013 |
| EP | 2768718 B1 | 3/2016 |
| EP | 2620351 B1 | 6/2016 |
| EP | 2135788 B1 | 6/2017 |
| GB | 2344481 A | 6/2000 |
| GB | 2497836 A | 12/2012 |
| GB | 2517835 A | 3/2015 |
| JP | 2000293797 A | 10/2000 |
| JP | 2004142543 A | 5/2004 |
| JP | 2004287884 A | 10/2004 |
| JP | 2005193742 A | 7/2005 |
| JP | 2014125196 A | 7/2014 |
| JP | 2014134082 A | 7/2014 |
| JP | 5586450 B2 | 9/2014 |
| JP | 5918683 B2 | 5/2016 |
| JP | 2016119032 A | 6/2016 |
| KR | 20090040024 A | 4/2009 |
| KR | 20100006714 A | 1/2010 |
| KR | 20130106005 A | 9/2013 |
| KR | 20160039460 A | 4/2016 |
| KR | 20160051993 A | 5/2016 |
| WO | WO 2006/064544 A1 | 6/2006 |

(56) References Cited

FOREIGN PATENT DOCUMENTS

| WO | WO 2010/006981 A1 | 1/2010 |
|----|-------------------|--------|
| WO | WO 2011/141096 A1 | 11/2011 |
| WO | WO 2013/123813 A1 | 8/2013 |
| WO | WO 2014/103492 A1 | 7/2014 |
| WO | WO 2015/068032 A1 | 5/2015 |
| WO | WO 2015/193058 A1 | 12/2015 |
| WO | WO 2016/046269 A1 | 3/2016 |
| WO | WO 2016/128200 A1 | 8/2016 |
| WO | WO 2016/134822 A1 | 9/2016 |
| WO | WO 2017/062448 A1 | 4/2017 |
| WO | WO 2017062448 A1 | 4/2017 |
| WO | WO 2017/073159 A1 | 5/2017 |
| WO | WO 2017/096307 A1 | 6/2017 |
| WO | WO 2017/096728 A1 | 6/2017 |
| WO | WO 2017/097942 A1 | 6/2017 |
| WO | WO 2017/118510 A1 | 7/2017 |
| WO | WO 2017/125514 A1 | 7/2017 |
| WO | WO 2017118510 A1 | 7/2017 |

OTHER PUBLICATIONS

Alberto Broggi and Elena Cardarelli, Vehicle Detection for Autonomous Parking Using a Soft-Cascade ADA Boost Classifier, Jun. 8, 2014.

Al-Sherbaz, Ali et al., Hybridisation of GNSS with other wireless/sensors technologies on board smartphones to offer seamless outdoors-indoors positioning for LBS applications, Apr. 2016, 3 pages.

Bill Howard, Bosch's View of the Future Car: Truly Keyless Entry, Haptic Feedback, Smart Parking, Cybersecurity, Jan. 9, 2017, 8 Pages.

Core System Requirements Specification (SyRS), Jun. 30, 2011, Research and Innovative Technology Administration.

DAIMLER AG, Remote Parking Pilot, Mar. 2016 (3 Pages).

Jingbin Liu, IParking: An Intelligent Indoor Location-Based Smartphone Parking Service, Oct. 31, 2012, 15 pages.

Land Rover develops a smartphone remote control for its SUVs, James Vincent, Jun. 18, 2015.

Search Report dated Jan. 19, 2018 for GB Patent Application No. 1711988.4 (3 pages).

Search Report dated Jul. 11, 2017 for GB Patent Application No. Enter 15/583,524, pp. 3.

Search Report dated Nov. 28, 2017, for GB Patent Application No. GB 1710916.6 (4 Pages).

Search Report dated Oct. 10, 2018 for GB Patent Application No. 1806499.8 (4 pages).

Tesla Model S Owner's Manual v2018.44. Oct. 29, 2018.

Vehicle's Orientation Measurement Method by Single-Camera Image Using Known-Shaped Planar Object, Nozomu Araki, Takao Sato, Yasuo Konishi and Hiroyuki Ishigaki, 2010.

* cited by examiner

MONITORING OF COMMUNICATION FOR VEHICLE REMOTE PARK-ASSIST

TECHNICAL FIELD

The present disclosure generally relates to remote park-assist and, more specifically, to monitoring of communication for vehicle remote park-assist.

BACKGROUND

Many vehicles include motive functions that are at least partially autonomously controlled by the vehicle. For example, some vehicles include cruise control in which the vehicle controls acceleration and/or deceleration of the vehicle so that a speed of the vehicle is maintained. Further, some vehicles include adaptive cruise control in which the vehicle controls acceleration and/or deceleration of the vehicle so that a speed of the vehicle and a following distance behind a lead vehicle are maintained. Additionally, some vehicles include park-assist features in which the vehicle autonomously controls motive functions of the vehicle to park the vehicle into a parking spot.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for monitoring of communication for vehicle remote park-assist. An example disclosed vehicle includes an autonomy unit for remote parking, a communication module, and a controller. The controller is to send a counter signal to and receive a return signal from a mobile device via the communication module, determine a time period between sending of the counter signal and receipt of the return signal, and prevent the autonomy unit from causing vehicle movement responsive to determining the time period is less than a threshold.

In some examples, responsive to determining the time period is less than or equal to the threshold, the controller is to enable the autonomy unit to cause the vehicle movement during the remote parking. In some examples, the controller further is to emit an alert responsive to determining the time period is greater than the threshold.

In some examples, the communication module is configured to wirelessly communicate via a Bluetooth® low energy protocol, a Wi-Fi® protocol, and a Wi-Fi® low power protocol. In some examples, the communication module sends the counter signal to trigger sending of the return signal to the communication module.

In some examples, the controller sends the counter signal via the communication module in response to determining that the remote parking is active. In some examples, the controller sends the counter signal via the communication module in response to determining that the mobile device is within a tethering range for the remote parking. In some examples, the controller sends the counter signal via the communication module further in response to the communication module receiving a remote parking instruction from the mobile device. Some examples further include an engine and an engine sensor. In such examples, the controller is to send the counter signal via the communication module in response to the engine sensor detecting that the engine is active. Some examples further include a transmission and a transmission position sensor. In such examples, the controller is to send the counter signal via the communication module in response to the transmission position sensor detecting that the transmission is not in park.

In some examples, the controller detects when the communication module sends the counter signal and receives the return signal. In some examples, the counter signal and the return signal include time stamps to enable the controller to determine when the counter signal was sent and the return signal was received.

In some examples, the controller is to send a series of counter signals via the communication module to monitor communication with the mobile device over a period of time while the autonomy unit performs the remote parking. In some such examples, the controller controls a rate at which the communication module sends the series of control signals. In some such examples, the controller adjusts the rate at which the communication module sends the series of control signals based upon at least one of a vehicle speed, a vehicle acceleration, and a proximity of the mobile device to an outer boundary of a tethering range.

In some examples, after the communication module receives the return signal, the controller is to send a second counter signal to and receive a second return signal from the mobile device via the communication module, determine a second time period between sending of the second counter signal and receipt of the second return signal, and prevent the autonomy unit from causing the vehicle movement responsive to determining the second time period is greater than the threshold.

An example disclosed method includes sending, via a communication module of a vehicle, a counter signal to a mobile device and receiving, via the communication module, a return signal from mobile device. The example disclosed method also includes determining, via a processor, a time period between sending of the counter signal and receipt of the return signal and preventing, via the processor, an autonomy unit from causing vehicle movement during remote parking responsive to determining the time period is less than a threshold.

Some examples further include, enabling, via the processor, the autonomy unit to cause the vehicle movement during the remote parking responsive to determining the time period is less than or equal to the threshold. In some examples, sending the counter signal via the communication module triggers sending of the return signal to the communication module. In some examples, the counter signal is sent via the communication module in response to determining that the remote parking is active.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
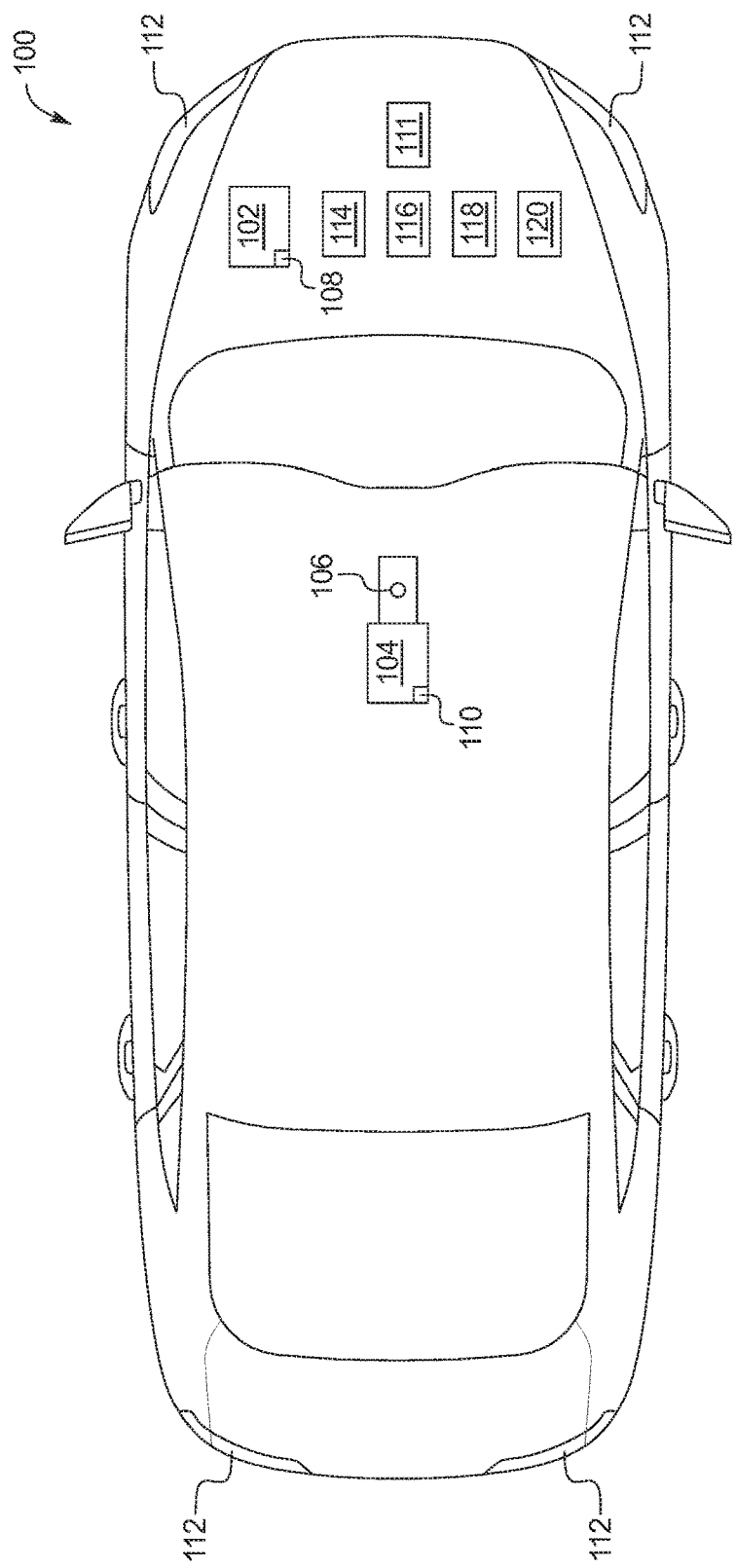
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many vehicles include motive functions that are at least partially autonomously controlled by the vehicle. For example, some vehicles include cruise control in which the vehicle controls acceleration and/or deceleration of the vehicle so that a speed of the vehicle is maintained. Further, some vehicles include adaptive cruise control in which the vehicle controls acceleration and/or deceleration of the vehicle so that a speed of the vehicle and a following distance behind a lead vehicle are maintained.

Additionally, some vehicles include park-assist systems, such as remote park-assist systems, in which the vehicle autonomously controls motive functions of the vehicle to park the vehicle into a parking spot. Remote park-assist systems are configured to autonomously park a vehicle when a driver has already exited the vehicle. Some remote park-assist system require the driver to provide a continuous input via a mobile device in wireless communication with the vehicle to instruct the vehicle to autonomously park in the parking spot. In some instances, there may be latency in communication between the mobile device and the vehicle that causes the vehicle to continue to receive an input from the mobile device when the operator is no longer providing an input to the mobile device. In such instances, the vehicle may potentially continue to perform remote park-assist functions when the operator no longer desires to perform such functions.

Examples methods and apparatus disclosed herein diagnose and mitigate latency and/or other communication errors between a vehicle and a mobile device that is configured to initiate remote park-assist features of the vehicle. Examples disclosed herein include a vehicle that wirelessly transmits incrementing counter signals to a mobile device at predetermined time intervals. In some examples, the time intervals between the counter signals vary as a function of vehicle speed (e.g., the time interval decreases as vehicle speed increases). The vehicle of examples disclosed herein increments the counter signal while remote park-assist of the vehicle is active. For example, the vehicle detects that remote park-assist is active if (i) the mobile device is within a tethering range of the vehicle, (ii) the mobile device is sending a remote-park assist instruction to the vehicle, (iii) an engine of the vehicle is running, (iv) a transmission of the vehicle is not in park, and/or (iii) the remote park-assist system is in a maneuver state. In examples disclosed herein, the counter signals are configured to trigger the mobile device to transmit corresponding return signals to the vehicle. Additionally, the vehicle compares the transmission times of the counter signals to the receipt times of the corresponding return signals to determine a delta time for each pair of a counter signal and a corresponding return signal. If the delta time is less than a threshold, the vehicle determines that there is no communication latency and permits performance of remote park-assist features to continue. If the delta time is greater than the threshold, the vehicle determines that there is communication latency between the mobile device and the vehicle and prevents further performance of remote park-assist features.

As used herein, "remote parking," "vehicle remote park-assist," "remote park-assist," and "RePA" refer to a vehicle controlling motive functions of the vehicle without direct steering or velocity input from an operator to autonomously park the vehicle into a parking spot while the operator is located outside of the vehicle. For example, a remote park assist-system of an autonomy unit controls the motive functions of the vehicle upon initiation from a driver to remotely park the vehicle into a parking spot.

As used herein, to "tether" refers to enabling a mobile device to cause a vehicle to perform remote parking. For example, a vehicle is configured to perform remote parking upon receiving instruction(s) to do so from a mobile device when the mobile device is tethered to the vehicle and is configured to not perform remote parking when the mobile device is untethered from the vehicle. As used herein, a "tethered" device refers to a mobile device that is enabled to send instructions to a vehicle to perform remote parking. For example, a mobile device is tethered to a vehicle responsive to the mobile device being wirelessly communicatively coupled to the vehicle and located within a predetermined tethering range (e.g., 6 meters) of the vehicle. In such examples, a mobile device that sends instructions to a vehicle to perform remote parking is untethered from the vehicle if the mobile device is beyond the tethering range of the vehicle. In some examples, a mobile device of an operator is tethered via communication between the vehicle and another device (e.g., a key fob) carried by the operator. In such examples, the vehicle may detect that the key fob is within a predetermined tethering range of the vehicle, presume that the operator is carrying both the key fob and the mobile device associated with the operator, and subsequently tether the mobile device to the vehicle.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes an engine 102, a transmission 104, and a gear stick 106.

For example, the engine 102 includes an internal combustion engine, an electric motor, a fuel-cell engine, and/or any other type of engine or motor that is configured to propel the vehicle 100. For example, an internal combustion engine generates mechanical power to propel the vehicle 100 by combusting fuel (e.g., gasoline, petrol, etc.), and an electric motor generates mechanical power to propel the vehicle 100 by converting electrical energy stored in a battery (e.g., of a battery cell and/or a battery pack) into mechanical energy.

The transmission 104 controls an amount of power generated by the engine 102 that is transferred to other components of the vehicle 100, such as a powertrain, wheels, etc. For example, the transmission 104 includes a gearbox that controls the amount of power transferred to the components of the vehicle 100. The gear stick 106 enables an operator (e.g., a driver) of the vehicle 100 to control a setting of the transmission 104 that affects how the engine 102 propels the vehicle 100. For example, the gear stick 106 enables the operator to position the transmission 104 in park, neutral, reverse, drive, first gear, etc.

Further, the vehicle 100 of the illustrated example includes an engine sensor 108 and a transmission position sensor 110. The engine sensor 108 detects whether the engine 102 is activated or deactivated. The transmission position sensor 110 detects a current position (e.g., park, neutral, reverse, drive, first gear, etc.) of the transmission 104 and/or the gear stick 106.

As illustrated in FIG. 1, the vehicle 100 also includes a vehicle speed sensor 111, external lamps 112, and a horn 114. For example, the vehicle speed sensor 111 detects a speed at which the vehicle 100 is travelling. In some examples, the vehicle speed sensor 111 detects an acceleration or deceleration of the vehicle 100 by monitoring the speed at which the vehicle 100 is traveling over a period of time. Further, the external lamps 112 emit light to facilitate operation of the vehicle 100 in low-light environments and/or to alert nearby vehicle(s), driver(s), pedestrian(s), and/or other people of functions being performed by the vehicle 100. For example, the external lamps 112 include headlamps, such as high-beam headlamps and low-beam headlamps, to illuminate an area in front of the vehicle 100 in low-light environments. Additionally or alternatively, the external lamps 112 include brake lamps to alert others that the vehicle 100 is about to turn and/or turn-signal lamps to alert others that the vehicle 100 is braking. Additionally, the horn 114 emits a loud audio signal. For example, an operator (e.g., a driver) of the vehicle 100 activates the horn 114 (e.g., by pressing a button located within a driving wheel of the vehicle 100) to alert pedestrians, vehicle operators, and/or other people of a presence of the vehicle 100 and/or of a nearby hazard.

Figure 2:
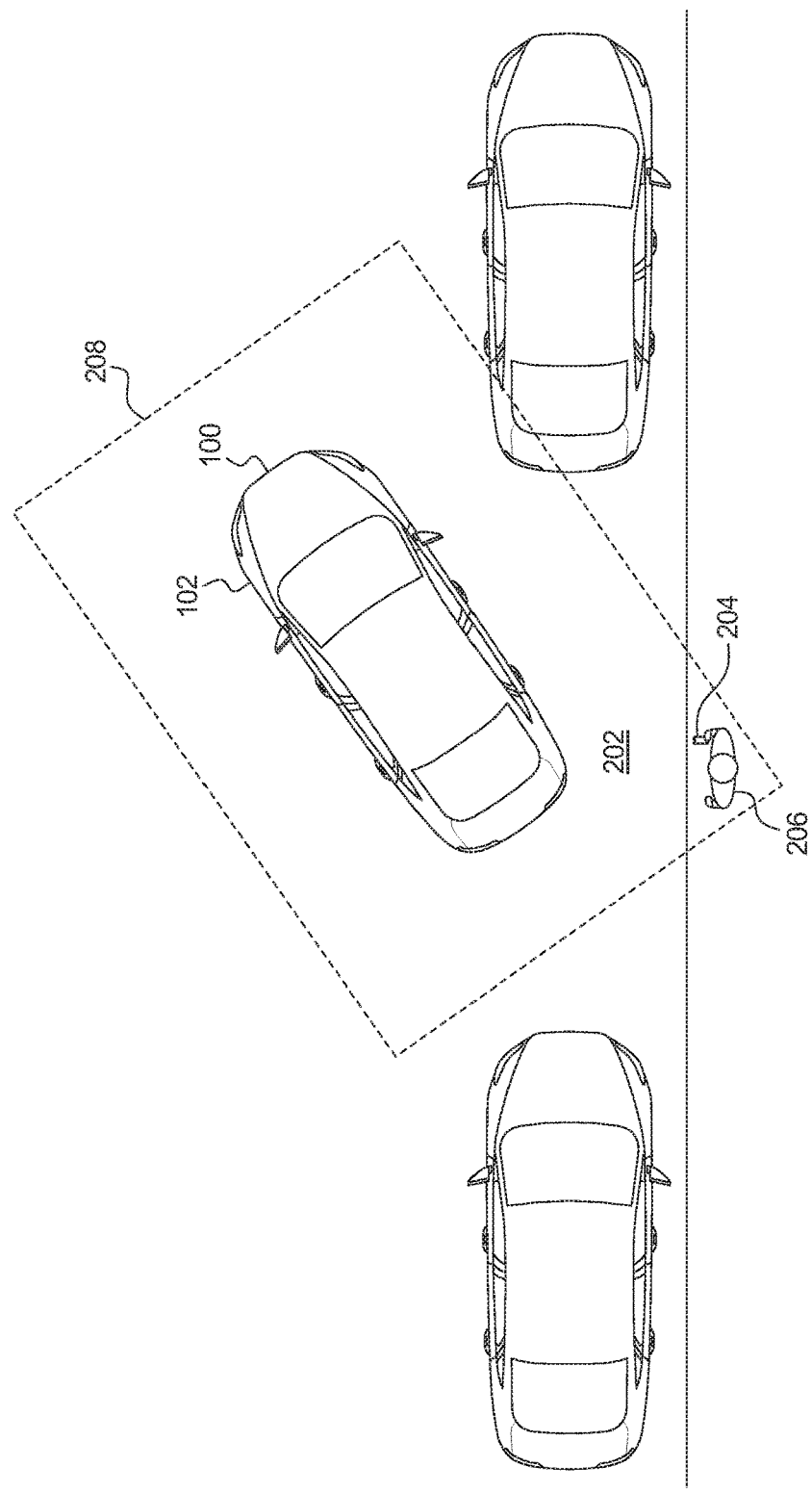
FIG. 2 illustrates an example mobile device initiating remote parking of the vehicle of FIG. 1.

The vehicle 100 of the illustrated example also includes a communication module 116 that is configured to communicatively connect to a mobile device of a user of the vehicle 100 (e.g., a mobile device 204 of a user 206 of FIG. 2). The communication module 116 includes hardware and firmware to establish a wireless connection with the mobile device. For example, the communication module 116 is a wireless personal area network (WPAN) module that wirelessly communicates with mobile device(s) of user(s) via short-range wireless communication protocol(s). In some examples, the communication module 116 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally or alternatively, the communication module 116 is configured to wirelessly communicate via Wi-Fi®, Wi-Fi® low power, Near Field Communication (NFC), UWB (Ultra-Wide Band), and/or any other short-range and/or local wireless communication protocol (e.g., IEEE 802.11 a/b/g/n/ac) that enables the communication module 116 to communicatively couple to a mobile device. In some examples, the communication module 116 wirelessly communicates via Wi-Fi® and/or Wi-Fi® low power protocols (e.g., Wi-Fi HaLow™ operating at 900 MHz) to facilitate communication with a mobile device when a line-of-sight between the communication module 116 and the mobile device is interrupted. Further, in some examples, the vehicle utilizes a Li-Fi protocol (e.g., a light-based LAN communication protocol) and/or a mid-frequency UHF protocol (e.g., at 433 MHz or 902 MHz) to communicate with the mobile device.

As illustrated in FIG. 1, the vehicle 100 includes an autonomy unit 118. The autonomy unit 118 is an electronic control unit (ECU) (e.g., one of a plurality of electronic control units 406 of FIG. 4) of the vehicle 100 that performs autonomous and/or semi-autonomous functions of the vehicle 100. For example, the autonomy unit 118 autonomously controls motive functions of the vehicle 100 to perform remote parking of the vehicle 100 into an available parking spot (e.g., a parking spot 202 of the FIG. 2) and/or to otherwise autonomously and/or semi-autonomously drive the vehicle 100. For example, the autonomy unit 118 controls motive functions of the vehicle 100 based on data collected from sensor(s) (e.g., radar sensor(s), lidar sensor(s), ultrasonic sensor(s), etc.) of the vehicle 100 and/or camera(s) of the vehicle 100.

The vehicle 100 of the illustrated example also includes a RePA controller 120 that monitors for latency in communication between the vehicle 100 and a mobile device (e.g., the mobile device 204) that is utilized by a user (e.g., the user 206) to initiate remote parking. For example, the RePA controller 120 of the illustrated examples sends a series of pings to the mobile device via the communication module 116 to monitor for latency in communication with mobile device over a period of time while the autonomy unit 118 performs remote parking. Each of the pings sent by the communication module 116 includes a counter signal that facilitates identification of latency in communication between the mobile device and the vehicle 100.

For example, the RePA controller 120 sends a counter signal to the mobile device via the communication module 116. Further, the RePA controller 120 is configured to receive a corresponding response signal from the mobile device via the communication module 116. To determine whether there is an acceptable or an unacceptable amount of latency in communication between the mobile device and the vehicle 100, the RePA controller 120 determines a time between the sending of the counter signal and the receipt of the return signal. For example, an acceptable amount of latency is less than a threshold amount of latency, and an unacceptable amount of latency is greater than or equal to the threshold amount of latency. Further, the RePA controller 120 compares the time period to a predetermined threshold (e.g., a latency threshold). The RePA controller 120 detects that there is unacceptable latency in communication between the mobile device and the vehicle 100 if the time period is greater than the predetermined threshold, and the RePA controller 120 detects that there is acceptable latency if the time period is less than or equal to the predetermined threshold. In response to detecting unacceptable latency, the RePA controller 120 emits an alert and/or prevents the autonomy unit 118 from causing the vehicle 100 to move during remote parking. For example, the alert is an audio alert emitted via the horn 114 and/or a visual alert emitted via one or more of the external lamps 112. Additionally or alternatively, the RePA controller 120 sends an instruction to the mobile device to emit the alert (e.g., an audio alert such as a chirp, a visual alert presented via a display, a haptic alert such as a vibration). Further, in response to detecting that there is acceptable latency, the RePA controller 120 enables the autonomy unit 118 to cause the vehicle 100 to move during remote parking.

In some examples, the RePA controller 120 sends the counter signals via the communication module 116 in response to determining that remote parking is active. The communication module 116 does not send counter signals to the mobile device when remote parking is inactive, for example, to reduce an amount of communication signals being sent between the vehicle 100 and the mobile device. The RePA controller 120 of the illustrated example detects remote parking is active in response to the communication module 116 determining that the mobile device is within a tethering range for remote parking (e.g., a tethering range 208 of FIG. 2), the communication module 116 receiving a remote parking instruction from the mobile device, the engine sensor 108 detecting that the engine 102 is active, and/or the transmission position sensor 110 detecting that the transmission 104 is not in park.

FIG. 2 illustrates the vehicle 100 being remotely parked into a parking spot 202 via a mobile device 204 of a user 206 (e.g., an operator of the vehicle 100). In the illustrated example, the parking spot 202 is a parallel parking spot. In other examples, the parking spot 202 for which the user 206 utilizes remote park-assist is a perpendicular parking spot or a diagonal parking spot.

As illustrated in FIG. 2, the autonomy unit 118 of the vehicle 100 performs remote parking when the user 206 is located outside of a cabin of the vehicle 100. The user 206 utilizes the mobile device 204 to send an instruction (also referred to as a RePA instruction) to the vehicle 100 to perform remote parking. For example, the user 206 provides an input to cause a communication module of the mobile device 204 to wirelessly send an instruction to the communication module 116 of the vehicle 100. The RePA controller 120 receives the instruction to perform remote parking from the mobile device 204 via the communication module 116.

Further, the RePA controller 120 determines whether the autonomy unit 118 is to perform remote parking upon receiving the instruction to do so based upon, at least in part, whether the mobile device 204 is tethered to the vehicle 100. For example, the mobile device 204 is tethered to the vehicle 100 responsive to the mobile device 204 being (i) wirelessly communicatively coupled to the communication module 116 of the vehicle 100 and (ii) located within a tethering range 208 of the vehicle 100. That is, the autonomy unit 118 is configured to perform remote parking of the vehicle 100 responsive to the RePA controller 120 determining that the mobile device 204 is within the tethering range 208 while sending the remote parking instruction to the vehicle 100. Further, the autonomy unit 118 is configured to not perform remote parking of the vehicle 100 responsive to the RePA controller 120 determining that the mobile device 204 is beyond the tethering range 208 while sending the remote parking instruction to the vehicle 100. That is, if the mobile device 204 moves from within to beyond the tethering range 208, the autonomy unit 118 (temporarily) disables performance of remote parking. To reactivate remote parking, the user 206 is to move mobile device 204 back into the tethering range and resend a remote parking instruction to the vehicle 100 while within the tethering range 208.

In the illustrated example, the tethering range 208 is defined based upon a predetermined distance (e.g., 6 meters) from an exterior surface of the vehicle 100. That is, the mobile device 204 is within the tethering range 208 of the vehicle 100 if a distance between the mobile device 204 and the exterior surface of the vehicle 100 is less than or equal to the predetermined distance. In some examples, the RePA controller 120 determines the distance between the mobile device 204 and the exterior surface of the vehicle 100 based upon received signal strength indicator(s) (RSSI) of signal(s) that are communicated between the mobile device 204 and the communication module 116. For example, the RePA controller 120 determines the distance between the mobile device 204 and the vehicle 100 based upon the RSSI(s) of the instruction(s) sent to the vehicle 100 by the mobile device 204 to perform remote parking. In some examples, the RePA controller 120 determines the distance between the mobile device 204 and the vehicle 100 via GPS locations of the mobile device 204 and the vehicle 100. Additionally or alternatively, the RePA controller 120 may utilize any other manner (e.g., time-of-flight, angle-of-arrival, etc.) for determining the distance between the mobile device 204 and the vehicle 100 during remote parking.

Figure 3:
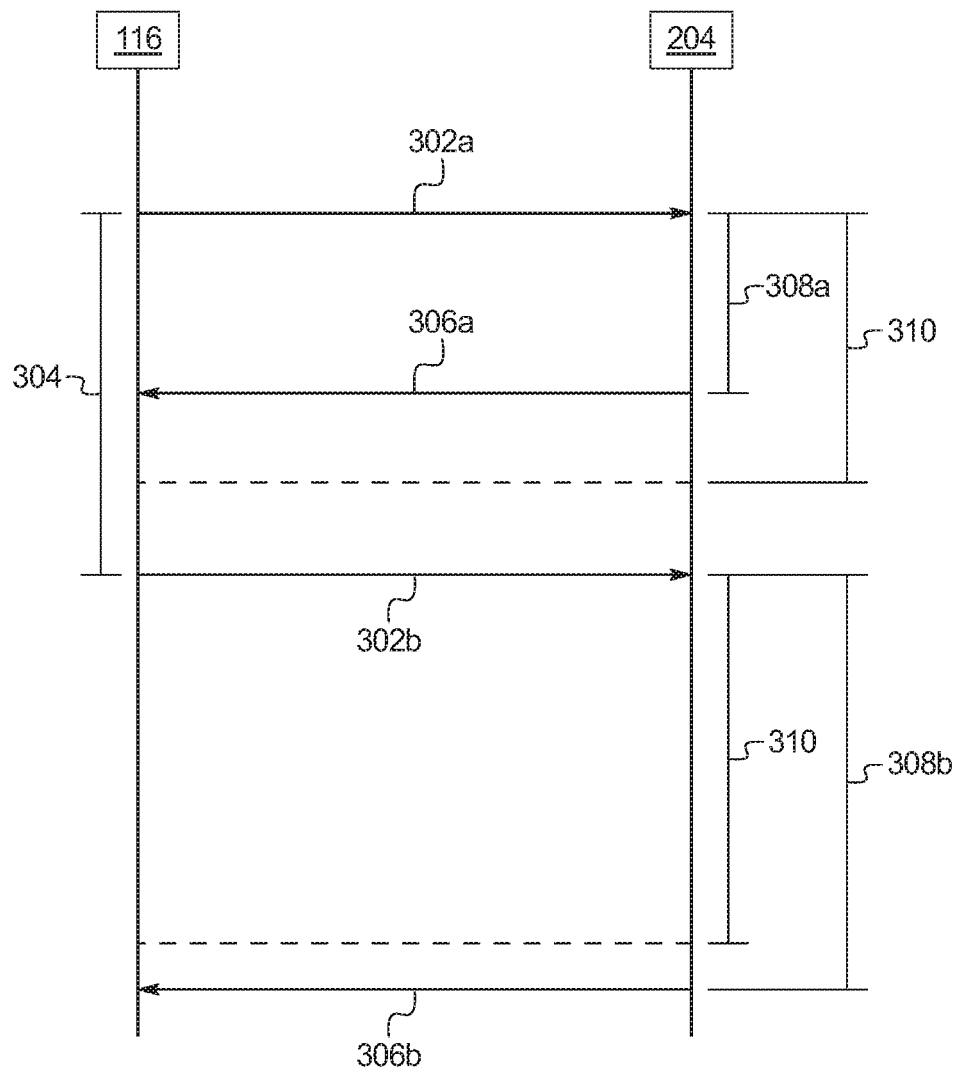
FIG. 3. depicts signals sent to monitor communication between the vehicle of FIG. 1 and the mobile device of FIG. 2.

FIG. 3. depicts signals sent to monitor the latency in communication between the vehicle 100 and the mobile device 204. As illustrated in FIG. 3, the communication module 116 of the vehicle sends a series of counter signals 302, including a counter signal 302a (e.g., a first counter signal) and a counter signal 302b (e.g., a second counter signal), to the mobile device 204. The communication module 116 sends the counter signals 302 to monitor communication with the mobile device 204 over a period of time while the autonomy unit 118 of the vehicle 100 is performing remote parking.

In the illustrated example, the communication module 116 sends the counter signal 302b at an interval 304 after the counter signal 302a. In some examples, the interval 304 is constant. In other examples, the RePA controller 120 is configured to adjust the interval 304 over time. In such examples, the RePA controller 120 is configured to adjust the rate at which the communication module 116 sends the counter signals 302 based upon the speed of the vehicle 100, the acceleration of the vehicle 100, the relative velocity between the vehicle 100 and the mobile device 204, the relative acceleration between the vehicle 100 and the mobile device 204, a proximity between the vehicle 100 and the mobile device 204, and/or a proximity between the mobile device 204 and the outer boundary of the tethering range 208 of the vehicle 100. For example, the RePA controller 120 increases the rate at which the communication module 116 sends the counter signals 302 in response to an increase of the vehicle speed, an increase of the vehicle acceleration, an increase in the relative velocity between the vehicle 100 and the mobile device 204, an increase in the relative acceleration between the vehicle 100 and the mobile device 204, a decrease in the distance between the vehicle 100 and the mobile device 204, and/or a decrease in distance between the mobile device 204 and the outer boundary of the tethering range 208.

As illustrated in FIG. 3, in response to the mobile device 204 receiving the counter signal 302a, the mobile device 204 sends a return signal 306a (e.g., a first return signal) to the communication module 116 of the vehicle 100. That is, the communication module 116 sends the counter signal 302a to trigger the mobile device 204 in sending the return signal 306a to the communication module 116.

Subsequently, the RePA controller 120 determines a time period 308a (e.g., a first time period) between the sending of the counter signal 302a and the receipt of the return signal 306a. In some examples, the RePA controller 120 detects when the communication module 116 sends the counter signal 302a and receives the return signal 306a. Additionally or alternatively, the counter signal 302a and the return signal 306a each include a respective time stamp to enable the RePA controller 120 to determine when the counter signal 302a was sent and the return signal 306a was received. In the illustrated example, the counter signal 302a and the return signal 306a triggered by the counter signal 302a include a counter identifier to facilitate the RePA controller 120 in identifying the pairing of the counter signal 302a and the return signal 306a. For example, the counter signal 302a and the return signal 306a include a counter identifier of "1" to indicate that the counter signal 302a is the first of the counter signals 302 and the return signal 306a is a first of the return signals 306 that was triggered by the first of the counter signals 302.

The RePA controller 120 also compares the time period 308a to a threshold 310 (e.g., a latency threshold). For example, the threshold 310 corresponds to a lower limit of time that is associated with latency in communication between the mobile device 204 and the communication module 116. In response to detecting that the time period 308a is greater than the threshold 310, the RePA controller 120 emits an alert and/or prevents the autonomy unit 118 from causing the vehicle 100 to move during remote parking. Otherwise, in response to detecting that the time period 308a is less than or equal to the threshold 310, the RePA controller 120 enables the autonomy unit 118 to cause the vehicle 100 to move during remote parking.

The communication module 116 and the mobile device 204 of the illustrated example continue to send and receive the series of counter signals 302 and the corresponding series of the return signals 306 for the duration of a remote parking event. For example, after the communication module 116 receives the return signal 306a and the RePA controller 120 determines that the time period 308a is less than or equal to the threshold 310, the communication module 116 of the vehicle sends another counter signal 302b to the mobile device 204. In some examples, the counter signal 302b includes a counter identifier of "1" to indicate that the counter signal 302b is the second of the counter signals 302. That is, the RePA controller 120 increments the counter identifier for each subsequent one of the counter signals to enable the RePA controller 120 to pair each of the counter signals 302 with a corresponding one of the return signals 306. In response to the mobile device 204 receiving the counter signal 302b, the mobile device 204 sends a return signal 306b (e.g., a second return signal) to the communication module 116. The RePA controller 120 subsequently determines a time period 308b (e.g., a second time period) between the sending of the counter signal 302b and the receipt of the return signal 306b. Further, the RePA controller 120 compares the time period 308b to the threshold 310 to determine the amount of latency in communicating the return signal 306b after the counter signal 302b.

Figure 4:
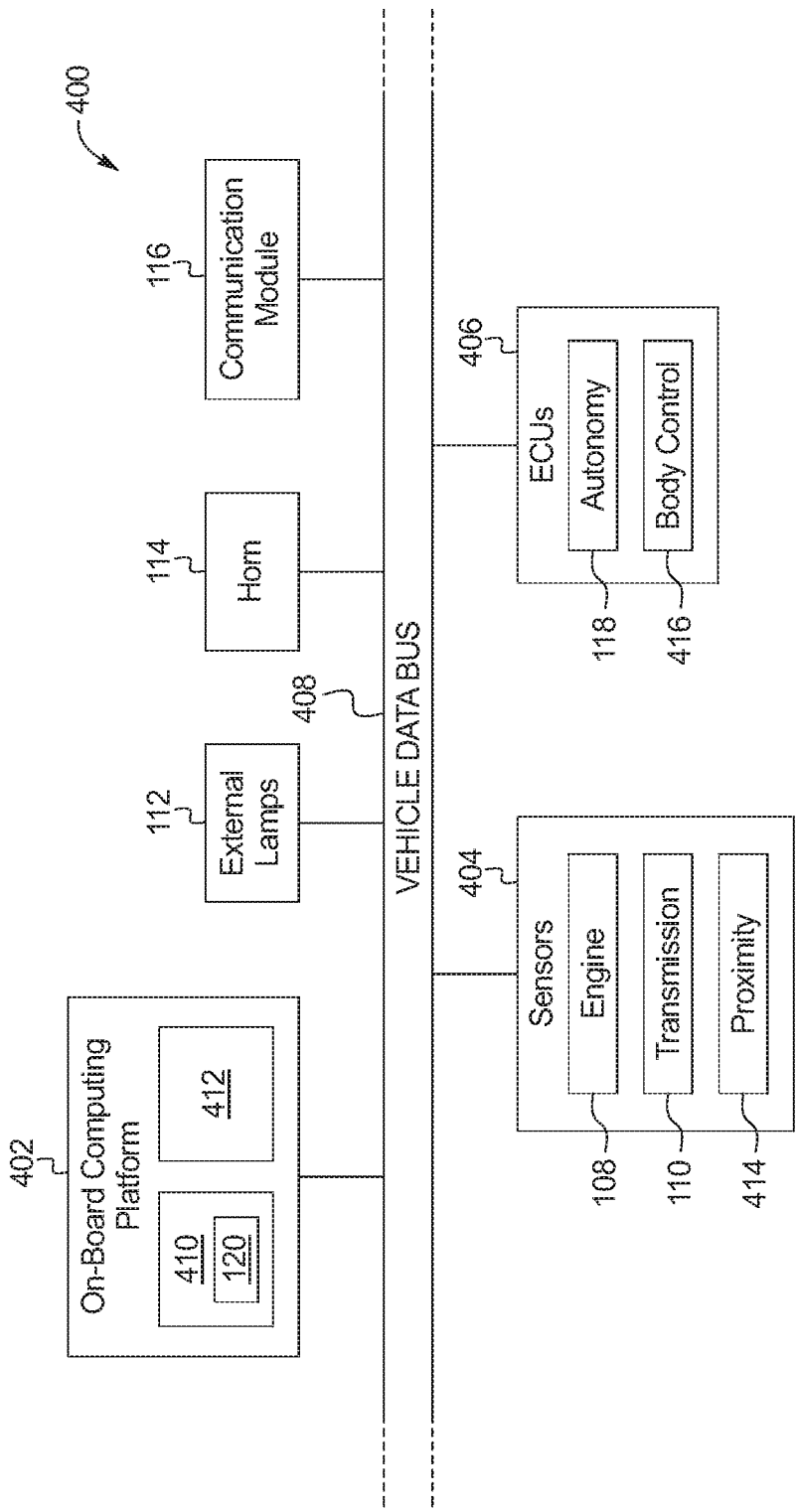
FIG. 4 is a block diagram of electronic components of the vehicle of FIG. 1.

FIG. 4 is a block diagram of electronic components 400 of the vehicle 100. As illustrated in FIG. 4, the electronic components 400 include an on-board computing platform 402, the external lamps 112, the horn 114, the communication module 116, sensors 404, electronic control units (ECUs) 406, and a vehicle data bus 408.

The on-board computing platform 402 includes a microcontroller unit, controller or processor 410 and memory 412. In some examples, the processor 410 of the on-board computing platform 402 is structured to include the RePA controller 120. Alternatively, in some examples, the RePA controller 120 is incorporated into another electronic control unit (ECU) with its own processor 410 and memory 412. The processor 410 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 412 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 412 includes multiple kinds of memory, particularly volatile memory and non-volatile memory.

The memory 412 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 412, the computer readable medium, and/or within the processor 410 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 404 are arranged in and around the vehicle 100 to monitor properties of the vehicle 100 and/or an environment in which the vehicle 100 is located. One or more of the sensors 404 may be mounted to measure properties around an exterior of the vehicle 100. Additionally or alternatively, one or more of the sensors 404 may be mounted inside a cabin of the vehicle 100 or in a body of the vehicle 100 (e.g., an engine compartment, wheel wells, etc.) to measure properties in an interior of the vehicle 100. For example, the sensors 404 include accelerometers, odometers, tachometers, pitch and yaw sensors, wheel speed sensors, microphones, tire pressure sensors, biometric sensors and/or sensors of any other suitable type.

In the illustrated example, the sensors 404 include the engine sensor 108, the transmission position sensor 110, one or more proximity sensors 414, and/or any other sensor (e.g., the vehicle speed sensor 111) that monitors a property of the vehicle 100 and/or the surrounding area. For example, the engine sensor 108 detects whether the engine 102 is activated or deactivated, and the transmission position sensor 110 detects a position (e.g., park, neutral, reverse, drive, first gear, etc.) of the transmission 104 and/or the gear stick 106. Further, the proximity sensors 414 monitor a surrounding area of the vehicle 100 to collect data that detects and identifies location(s) of object(s) near the vehicle 100. For example, the proximity sensors 414 collect the data to facilitate the autonomy unit 118 in performing autonomous and/or semi-autonomous driving maneuvers (e.g., remote parking) of the vehicle 100. The proximity sensors 414 include radar sensor(s), lidar sensor(s), ultrasonic sensor(s), and/or any other sensor(s) that detects the presence and location of nearby objects. For example, a radar sensor detects and locates an object via radio waves, a lidar sensor detects and locates the object via lasers, and an ultrasonic sensor detects and locates the object via ultrasound waves.

The ECUs 406 monitor and control the subsystems of the vehicle 100. For example, the ECUs 406 are discrete sets of electronics that include their own circuit(s) (e.g., integrated circuits, microprocessors, memory, storage, etc.) and firmware, sensors, actuators, and/or mounting hardware. The ECUs 406 communicate and exchange information via a vehicle data bus (e.g., the vehicle data bus 408). Additionally, the ECUs 406 may communicate properties (e.g., status of the ECUs 406, sensor readings, control state, error and diagnostic codes, etc.) to and/or receive requests from each other. For example, the vehicle 100 may have seventy or more of the ECUs 406 that are positioned in various locations around the vehicle 100 and are communicatively coupled by the vehicle data bus 408.

In the illustrated example, the ECUs 406 include the autonomy unit 118 and a body control module 416. The autonomy unit 118 controls performance of autonomous and/or semi-autonomous driving maneuvers (e.g., remote parking) of the vehicle 100 based upon, at least in part, image(s) and/or video captured by camera(s) and/or data collected by one or more of the sensors 404 of the vehicle 100. The body control module 416 controls one or more subsystems throughout the vehicle 100, such as power windows, power locks, an immobilizer system, power mirrors, etc. For example, the body control module 416 includes circuits that drive one or more of relays (e.g., to control wiper fluid, etc.), brushed direct current (DC) motors (e.g., to control power seats, power locks, power windows, wipers, etc.), stepper motors, LEDs, etc.

The vehicle data bus 408 communicatively couples the external lamps 112, the horn 114, the communication module 116, the on-board computing platform 402, the sensors 404, and the ECUs 406. In some examples, the vehicle data bus 408 includes one or more data buses. The vehicle data bus 408 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 5:
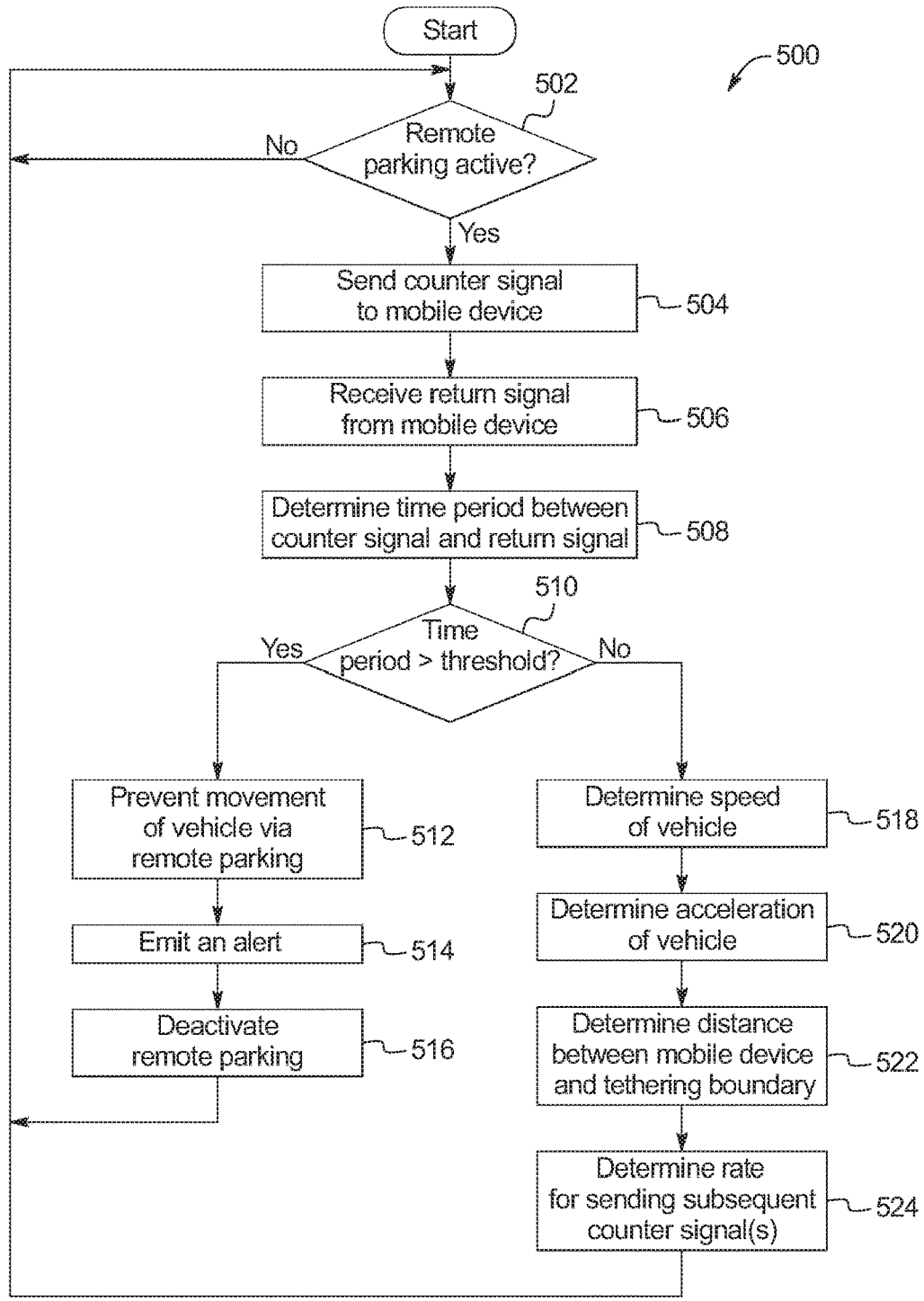
FIG. 5 is a flowchart for monitoring of communication for remote park-assist in accordance with the teachings herein.

FIG. 5 is a flowchart of an example method 500 to monitor communication for vehicle remote park-assist. The flowchart of FIG. 5 is representative of machine readable instructions that are stored in memory (such as the memory 412 of FIG. 4) and include one or more programs which, when executed by a processor (such as the processor 410 of FIG. 4), cause the vehicle 100 to implement the example RePA controller 120 of FIGS. 1 and 4. While the example program is described with reference to the flowchart illustrated in FIG. 5, many other methods of implementing the example RePA controller 120 may alternatively be used. For example, the order of execution of the blocks may be rearranged, changed, eliminated, and/or combined to perform the method 500. Further, because the method 500 is disclosed in connection with the components of FIGS. 1-4, some functions of those components will not be described in detail below.

Initially, at block 502, the RePA controller 120 determines whether remote parking of the vehicle 100 is active. For example, the RePA controller 120 determines that remote parking is active for the vehicle 100 in response to receiving a remote parking instruction from the mobile device 204, determining that the mobile device 204 is within the tethering range 208 of the vehicle 100, detecting via the engine sensor 108 that the engine 102 is active, and/or detecting via the transmission position sensor 110 that the transmission 104 is not in park. In response to the RePA controller 120 determining that remote parking is not activated, the method 500 remains at block 502. Otherwise, in response to the RePA controller 120 determining that remote parking is activated, the method 500 proceeds to block 504.

At block 504, the RePA controller 120 sends, via the communication module 116 of the vehicle 100, a counter signal (e.g., a first counter signal) to the mobile device 204 that is being utilized to initiate remote parking. For example, the RePA controller 120 sends the counter signal to trigger the mobile device 204 to send a return signal. At block 506, the RePA controller 120 receives, via the communication module 116, a return signal (e.g., a first counter signal) that was sent by the mobile device 204. For example, the mobile device 204 sends the return signal upon receiving the counter signal. At block 508, the RePA controller 120 determines a time period between a sending of the counter signal and a receipt of the return signal. In some examples, the RePA controller 120 detects when the communication module 116 sends the counter signal and receives the return signal to determine the time period between the counter signal and the return signal. Additionally or alternatively, the counter signal and the return signal include respective time stamps to enable the RePA controller 120 to determine the time period between the counter signal and the return signal.

At block 510, the RePA controller 120 determines whether the time period between the counter signal and the return signal is greater than a latency threshold. In response to the RePA controller 120 determining that the time period is greater than the latency threshold, the method 500 proceeds to block 512 at which the RePA controller 120 prevents the autonomy unit 118 from causing movement of the vehicle 100 during remote parking. At block 514, the RePA controller 120 emits an alert to indicate to the user 206 that the RePA controller 120 has detected an unacceptable amount of latency in communication between the mobile device 204 and the vehicle 100. For example, the RePA controller 120 emits an audio alert via the horn 114 and/or a visual alert via one or more of the external lamps 112. At block 516, the RePA controller 120 deactivates remote parking upon detecting an unacceptable amount of latency in communication between the mobile device 204 and the vehicle 100. To restart remote parking of the vehicle 100, the user 206 subsequently is to reinitiate remote parking of the vehicle 100.

Returning to block 510, in response to the RePA controller 120 determining that the time period is less than or equal to the latency threshold, the method 500 proceeds to block 518 at which the RePA controller 120 determines a speed at which the vehicle 100 is traveling (e.g., via the vehicle speed sensor 111). In some examples, the RePA controller 120 determines a speed of the vehicle 100 relative to the mobile device 204 (i.e., a relative velocity) by monitoring a distance between the vehicle 100 and the mobile device 204 (e.g., via received signal strength indicators, time-of-flight, angle-of-arrival, etc.) over a period of time.

At block 520, the RePA controller 120 determines an acceleration of the vehicle 100. For example, the RePA controller 120 determines the acceleration via an accelerometer of the vehicle 100 and/or via the vehicle speed sensor 111 by monitoring the speed of the vehicle 100 over a period of time. In some examples, the RePA controller 120 determines an acceleration of the vehicle 100 relative to the mobile device 204 (i.e., a relative acceleration) by monitoring a distance between the vehicle 100 and the mobile device 204 (e.g., via received signal strength indicators, time-of-flight, angle-of-arrival, etc.) over a period of time.

At block 522, the RePA controller 120 determines a distance between the mobile device 204 and an outer boundary of the tethering range 208. For example, to determine the distance between the mobile device 204 and the outer boundary of the tethering range 208, the RePA controller 120 (i) identifies the tethering range 208 of the vehicle 100, (ii) determines a distance between the vehicle 100 and the mobile device 204 (e.g., via received signal strength indicators, time-of-flight, angle-of-arrival, etc.) and (iii) and compares the tethering range 208 to the distance between the vehicle 100 and the mobile device 204.

At block 524, the RePA controller 120 determines a rate at which the RePA controller 120 pings the mobile device 204 with subsequent counter signal(s). For example, the RePA controller 120 adjusts the rate based upon the speed of the vehicle 100, the acceleration of the vehicle 100, the relative velocity between the vehicle 100 and the mobile device 204, the relative acceleration between the vehicle 100 and the mobile device 204, a distance between the vehicle 100 and the mobile device 204, and/or a distance between the mobile device 204 and the outer boundary of the tethering range 208 of the vehicle 100. Upon the RePA controller 120 determining the rate at which to ping the mobile device 204 with counter signal(s), the method 500 returns to block 502.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module," "unit," and "node" refer to hardware with circuitry to provide communication, control and/or monitoring capabilities, often in conjunction with sensors. A "module," a "unit," a "node" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    an autonomy unit for remote parking;
    a communication module; and
    a controller to:
        send a counter signal to and receive a return signal from a mobile device via the communication module;
        determine a time period between sending of the counter signal and receipt of the return signal; and
        prevent the autonomy unit from causing vehicle movement responsive to determining the time period is greater than a threshold.

2. The vehicle of claim 1, wherein, responsive to determining the time period is less than or equal to the threshold, the controller is to enable the autonomy unit to cause the vehicle movement during the remote parking.

3. The vehicle of claim 1, wherein the controller further is to emit an alert responsive to determining the time period is greater than the threshold.

4. The vehicle of claim 1, wherein the communication module is configured to wirelessly communicate via a Bluetooth® low energy protocol, a Wi-Fi® protocol, a Wi-Fi® low power protocol, and a UHF protocol.

5. The vehicle of claim 1, wherein the communication module sends the counter signal to trigger sending of the return signal to the communication module.

6. The vehicle of claim 1, wherein the controller sends the counter signal via the communication module in response to determining that the remote parking is active.

7. The vehicle of claim 1, wherein the controller sends the counter signal via the communication module in response to determining that the mobile device is within a tethering range for the remote parking.

8. The vehicle of claim 1, wherein the controller sends the counter signal via the communication module in response to the communication module receiving a remote parking instruction from the mobile device.

9. The vehicle of claim 1, further including an engine and an engine sensor, wherein the controller is to send the counter signal via the communication module in response to the engine sensor detecting that the engine is active.

10. The vehicle of claim 1, further including a transmission and a transmission position sensor, wherein the controller is to send the counter signal via the communication module in response to the transmission position sensor detecting that the transmission is not in park.

11. The vehicle of claim 1, wherein the controller detects when the communication module sends the counter signal and receives the return signal.

12. The vehicle of claim 1, wherein the counter signal and the return signal include time stamps to enable the controller to determine when the counter signal was sent and the return signal was received.

13. The vehicle of claim 1, wherein the controller is to send a series of counter signals via the communication module to monitor communication with the mobile device over a period of time while the autonomy unit performs the remote parking.

14. The vehicle of claim 13, wherein the controller controls a rate at which the communication module sends the series of control signals.

15. The vehicle of claim 14, wherein the controller adjusts the rate at which the communication module sends the series of control signals based upon at least one of a vehicle speed, a vehicle acceleration, and a proximity of the mobile device to an outer boundary of a tethering range.

16. The vehicle of claim 1, wherein, after the communication module receives the return signal, the controller is to:
    send a second counter signal to and receive a second return signal from the mobile device via the communication module;
    determine a second time period between sending of the second counter signal and receipt of the second return signal; and
    prevent the autonomy unit from causing the vehicle movement responsive to determining the second time period is greater than the threshold.

17. A method comprising:
    sending, via a communication module of a vehicle, a counter signal to a mobile device;

receiving, via the communication module, a return signal from the mobile device;

determining, via a processor, a time period between sending of the counter signal and receipt of the return signal; and preventing, via the processor, an autonomy unit from causing vehicle movement during remote parking responsive to determining the time period is greater than a threshold.

18. The method of claim 17, further including, enabling, via the processor, the autonomy unit to cause the vehicle movement during the remote parking responsive to determining the time period is less than or equal to the threshold.

19. The method of claim 17, wherein sending the counter signal via the communication module triggers sending of the return signal to the communication module.

20. The method of claim 17, wherein the counter signal is sent via the communication module in response to determining that the remote parking is active.

* * * * *